Patented Jan. 26, 1943

2,309,113

UNITED STATES PATENT OFFICE 2,309,113

TREATMENT OF ARTIFICIAL PROTEIN FILMS AND FILAMENTS

Oskar Huppert, Chicago, Ill., assignor to The Glidden Company, Cleveland, Ohio, a corporation of Ohio No Drawing. Application May 13, 1940, Serial No. 334,920

22 Claims. (Cl. 8—142.5)

The present invention relates to the after-treatment of artificial protein films and filaments.

Films and filaments manufactured by the usual methods from soya protein which has been only slightly hydrolyzed by pepsin, or from soya protein which has been more or less hydrolyzed by means of alkalies are brittle and fragile. Solutions of hydrolyzed soya protein treated in accordance with United States Patent No. 2,112,210, in which the protein is dissolved in sodium hydroxide at a pH corresponding at most to that of a solution of calcium hydroxide, treated with carbon disulfide, and oxidized with air, forms solutions of better spinning viscosity and of better stability, and filaments spun from such a solution have a greater tensile strength as shown by their greater stretchability.

In my German application H. 153,501 IV c/12p filed August 1, 1939, I described the after treatment of soya protein wool with Igepon (sodium salt of the oleic acid derivative of isethionic acid, $CH_3(CH_2)_7CH:CHCH(CH_2)_7COOCH_2CH_2SO_3Na$, and the condensation product of a fatty acid with taurin, $C_{17}H_{33}CONHCH_2CH_2SO_3Na$), and Stocko preparation (a solution of a sulfonated alcohol in an organic solvent) to produce a fiber which was soft, elastic and flexible Synthetic soya wool treated in this manner, however, loses its good qualities to a considerable extent after washing.

I have now found that filaments and films prepared from either sulfurized protein produced in accordance with the aforementioned patent or from nonsulfurized soya protein remain elastic and flexible after washing, if they are subjected to an after-treatment with a solution containing at least 20% by volume of polyhydric alcohols such as glycerol, glycol, glycol ethers, etc., and after impregnation are first dried at a temperature not exceeding 60° C. and after drying are exposed to a temperature of over 100° C., preferably about 120° C., for a few minutes. The after-treatment solution may preferably also contain various softening agents, waterproofing agents, emulsifying agents, wetting agents, detergents, lubricants, etc., such as are conventionally used in the textile industry. Among these various agents may be mentioned fatty alcohol sulfates, sulfonated oils, aqueous emulsions of synthetic resins such as urea, alkyl and vinyl resins, quaternary ammonium compounds such as stearylureidomethyl pyridinium chloride, Velan (a stearyl, oxy-methyl pyridinium chloride) Fixanol (cetyl pyridinium sulfate bromide or chloride, preferably the bromide) emulsified paraffin wax, etc.

It has also been found that the tensile strength of the films and filaments can be increased if they are likewise impregnated with a solution containing about 2% thiogelatine manufactured in accordance with the above patent in which gelatine is the protein treated.

I have further found that it is possible to avoid an agglutination or sticking of the individual elementary filaments and to effect a better separation of the individual threads if the filaments after being hardened are treated with nitrous acid. It is surprising that the strength, elasticity and flexibility of the synthetic wool is not damaged by this treatment with nitrous acid. On the contrary the synthetic wool is rendered more resistant to boiling water and takes dyes easier. The filaments so treated become hydrophobic, permanently waterproof and fast to washing and dry cleaning.

The improved results described above in connection with soya protein fibers are also obtained in the case of films and filaments prepared from spinning solutions from casein and zein treated in accordance with the method described in the above United States patent when they are subjected to the aforementioned baking treatment. It is this baking treatment which fixes the alcohol in the after-treated product and thereby retaining the flexibility upon washing.

*Example 1*

300 g. of hydrolyzed soya protein are dissolved in 1560 cc. water containing 15 g. sodium hydroxide. The soya spinning solution so obtained is allowed to ripen one or two days and is freed from air before spinning. It is spun in a precipitation bath of a combination of 25% sulphuric acid and 15% sodium sulfate. The filaments or films are then further treated in 5% formaldehyde and 8% sodium chloride, well washed and further treated 15 minutes in a bath containing 2% Igepon, 1% sulphonated castor oil, ½% mineral oil and 20% by volume glycerol. Afterwards they are dried in an air current at 60° C. The wool or film dried in this way is exposed to a temperature of 120° C. for three minutes.

*Example 2*

Filaments or films obtained from soya protein spinning solutions are immersed after hardening and washing for 15 minutes in a bath containing water, 2% Duponol (a higher fatty alcohol sulfate), 1% Monopoloil (a highly sulfated castor oil), 2% thiogelatine and 20% glycol. Afterwards they are dried in an air current at 60° C. The wool or film dried in this way is exposed to a temperature of 120° C. for three minutes.

Example 3

300 g. hydrolyzed soya protein are added to 1410 cc. of water. While agitating 150 cc. of caustic solution 10% by volume are added, until the pH of the solution reaches 9–10. The solution is warmed at 45° C. and at this temperature 23 cc. carbon disulfide is added with vigorous stirring. The mixture is stirred for one-half hour whereby the pH is lowered to 6–7. Air is bubbled into the solution which is held at 60° C. with vigorous stirring for one hour and then is cooled under stirring at room temperature. The spinning solution so made is allowed under stirring to cool. The filaments or films after hardening and washing are soaked 15 minutes in a bath containing water, 1% Duponol, ½% Monopoloil, ¼% mineral oil, ½% diglycolstearate, ½% paraffin, 2% thiogelatine and 20% glycol by volume. Afterwards they are dried in an air current at 60° C. The wool or film dried in this way is exposed to a temperature of 120° C. for three minutes.

Example 4

The spinning process is the same as that given in Example 1. The filaments or films, after hardening, are treated for five minutes in a bath containing 2% sodium nitrite, and after washing are soaked in a bath containing water, 2% Igepon, 1% sulphonated castor oil and 20% glycerol by volume.

Example 5

The spinning process is the same as that given in Example 1. The filaments, after hardening are treated in a bath of 2% sodium nitrite for five minutes, and after washing are soaked in a bath containing water, 2% Duponol, 2% thiogelatine, 1% paraffin, 2% diglycolstearate, 20% Cellosolve (ethylene glycol monoethyl ether) by volume.

Example 6

The spinning process is the same as that given in Example 3. The filaments or films are soaked after hardening in a bath of 2% sodium nitrite for 5 minutes, and after washing are immersed 15 minutes in a bath containing water, 2% Igepon, 1% sulphonated castor oil, ½% mineral oil, 2% thiogelatine and 20% glycol by volume. Afterwards they are dried in an air current at 60° C. The wool or films dried in this way are exposed to a temperature of 120° C. for three minutes.

Example 7

1100 g. casein (2750 g. curds of 40% protein content and 60% water) are steeped in 5456 cc. of water (3800 cc. water added) at 24° C. and well stirred. After three hours, while agitating, there is added 258 cc. sodium hydroxide 21.5% by volume. After three hours the solution is heated to 45° C. and at this temperature 80 cc. carbon disulfide is added with vigorous stirring. The mixture is stirred for one-half hour whereby the pH is lowered from 9–10 to 6–7. Air is bubbled into the solution which is held at 60° C. with vigorous stirring for one hour. After 44 g. of urea or 50 g. stearylamin have been added the solution is spun to artificial casein wool.

The filaments are soaked after hardening in a bath of 2% sodium nitrite for 5 minutes, and after washing are immersed 15 minutes in a bath containing water, 1% Igepon, ½% sulphonated castor oil, ½% mineral oil, 1% thiogelatine, 2% Velan PF and 20% glycerol by volume.

Afterwards they are dried in an air current at 60° C. The wool dried in this way is exposed to a temperature of 120° C. for three minutes.

Example 8

200. g. zein derived by extraction of the gluten of corn are dissolved in 1400 cc. 95% alcohol, containing 10 g. sodium hydroxide. The solution is heated to 35° C. and at this temperature 25 cc. carbon disulfide is added with vigorous stirring for one-half hour. Air is bubbled into the solution which is held at 50° C. with vigorous stirring. The filaments obtained by spinning this solution according to known spinning methods are soaked after hardening in a bath of 2% sodium nitrite for 5 minutes, and after washing are immersed 15 minutes in a bath containing 2% Igepon, 2% thiogelatine, 2% Velan PF and 20% glycol by volume. Afterwards they are dried in an air current at 60° C. The wool or film dried in this way is exposed to a temperature of 120° C. for three minutes.

It will be understood that the detailed procedures described are capable of wide variation and modification without departing from the spirit of this invention.

Having now particularly described and ascertained the nature of my said invention and in what manner it may be performed, I declare that what I claim is:

1. The process of treating synthetic wool filaments, films and the like characterized in that filaments or films produced from more or less hydrolyzed soya protein, are soaked in an after-treatment solution comprising at least about 20% by volume of a lower water soluble alcohol selected from the class consisting of glycerol, glycol, and glycol ether to give the desired degree of flexibility to the treated product, and are exposed, after drying at a temperature not exceeding 60° C., to a temperature of above 100° C. for a short time, whereby loss of flexibility of the product when subsequently washed is greatly reduced.

2. The process of claim 1 in which the heat treatment is at about 120° C.

3. The process of treating synthetic wool, filaments, films and the like, characterized in that filaments or films produced from protein disulfide formed by treating a protein hydrolysate with carbon disulfide at a hydroxyl ion concentration which at most corresponds to that of a solution of calcium hydroxide and oxidizing the thus sulfurized protein to form the disulfide, are soaked in an after-treatment solution containing a sufficient amount of a lower water soluble polyhydric alcohol selected from the class consisting of glycerol, glycol and glycol ether to give the desired degree of flexibility to the treated product, and are exposed, after drying at a temperature not exceeding 60° C. to a temperature above 100° C. for a short time, whereby loss of flexibility of the product when subsequently washed is greatly reduced.

4. The process of treating synthetic wool, filaments, films and the like, characterized in that filaments or films produced from protein disulfide formed by treating a protein hydrolysate with carbon disulfide at a hydroxyl ion concentration which at most corresponds to that of a solution of calcium hydroxide and oxidizing the thus sulfurized protein to form the disulfide, are soaked in an after-treatment solution containing sufficient lower water soluble polyhydric alcohol selected from the class consisting of glycerol, glycol and glycol ether to impart a desired degree of flexibility to the treated product, and are exposed, after drying at a temperature not exceeding 60° C., to a temperature of about 120° C. for a short time, whereby loss of flexibility of the product when subsequently washed is greatly reduced.

5. The process of treating synthetic wool, filaments, and the like characterized in that filaments or films produced from protein disulfide formed by treating a protein hydrolysate with carbon disulfide at a hydroxyl ion concentration which at most corresponds to that of a calcium hydroxide solution and oxidizing the thus sulfurized protein to form the disulfide, are soaked in an after-treatment solution containing at least about 20% of lower water soluble polyhydric alcohol selected from the class consisting of glycerol, glycol and glycol ether to impart a desired degree of flexibility to the treated product, and are exposed, after drying at a temperature not exceeding 60° C., to a temperature of about 120° C. for a short time whereby loss of flexibility of the product when subsequently washed is greatly reduced.

6. The process of treating artificial wool, filaments, films and the like characterized in that filaments and films produced from a soya protein disulfide formed by treating soya protein hydrolysate with carbon disulfide at a hydroxyl ion concentration which at most corresponds to that of a solution of calcium hydroxide and oxidizing the thus sulfurized protein disulfide to form the disulfide, are soaked in an after-treatment solution containing at least 20% by volume of a lower water soluble polyhydric alcohol selected from the class consisting of glycerol, glycol and glycol ether to impart a desired degree of flexibility to the product, and are exposed, after drying at a temperature not exceeding 60° C., to a temperature of about 120° C. for a short time whereby loss of flexibility of the product when subsequently washed is greatly reduced.

7. The process of treating artificial wool, filaments, films and the like characterized in that filaments and films produced from protein disulfide formed by treating a protein hydrolysate with carbon disulfide at a hydroxyl ion concentration which at most corresponds to that of a solution of calcium hydroxide and oxidizing the thus sulfurized protein to form the disufide, are soaked in an after-treatment bath containing at least 20% of a lower water soluble alcohol selected from the class consisting of glycerol, glycols and glycol ether, to impart a desired degree of flexibility to the treated product, and are exposed, after drying at a temperature not exceeding 60° C., to a temperature above 100° C. for a short time, whereby loss of flexibility of the product when subsequently washed is greatly reduced.

8. The process of treating artificial wool, filaments, films and the like characterized in that filaments and films produced from a soya protein disulfide formed by treating a soya protein hydrolysate with carbon disulfide at a hydroxyl ion concentration which at most corresponds to that of a solution of calcium hydroxide and oxidizing the thus sulfurized protein to form the disulfide, are soaked in an after-treatment both comprising at least 20% of a lower water soluble alcohol selected from the class consisting of glycerol, glycol and glycol ether, and are exposed, after drying at a temperature not exceeding 60° C., to a temperature over 100° C. for a short time, whereby loss of flexibility of the product after subsequent washing is greatly reduced.

9. The process of treating synthetic wool filaments, threads, films and the like, characterized in that filaments or films prepared from at least partially hydrolyzed soya protein are subjected to an after-treatment in a solution containing sufficient water-soluble polyhydric alcohol selected from the class consisting of glycerol, glycol and glycol ether to impart the desired degree of flexibility to the treated product, and are exposed, after drying at a temperature not exceeding 60° C., to a temperature of about 100° C. for a short time.

10. Process of treating synthetic wool, filaments, films and the like, characterized in that filaments or films, produced from more or less hydrolyzed soya protein, are soaked in an after-treatment solution comprising at least 20% glycerol, and are exposed, after drying at a temperature not over 60° C., to a temperature of approximately 120° C. for a short time.

11. Process of treating synthetic wool, filaments, films and the like, characterized in that filaments or films produced from more or less hydrolyzed soya protein, are soaked in an after-treatment solution comprising at least 20% glycol, and are exposed, after drying at a temperature of not over 60° C., to a temperature of approximately 120° C. for a short time.

12. Process of treating synthetic wool, filaments, films and the like, characterized in that filaments or films produced by spinning solutions prepared from protein disulfide formed by treating a protein hydrolysate with carbon disulfide at a hydroxyl ion concentration which at most corresponds to that of a solution of calcium hydroxide and oxidizing the thus sulfurized protein to form the disulfide, are soaked in an after-treatment solution comprising at least 20% glycerol, and are exposed, after drying at a temperature of not over 60° C., to a temperature of 120° C. for a short time.

13. Process of treating synthetic wool, filaments, films and the like characterized in that filaments or films, produced by spinning solutions prepared from protein disulfide formed by treating a soya protein hydrolysate with carbon disulfide at a hydroxyl ion concentration which at most corresponds to that of a solution of calcium hydroxide and oxidizing the thus sulfurized protein to form the disulfide, are soaked in an after-treatment solution comprising at least 20% glycol, and are exposed, after drying at a temperature not over 60° C., to a temperature of 120° C. for a short time.

14. Process of treating synthetic wool, filaments, films and the like characterized in that filaments or films from more or less hydrolyzed soya protein are soaked in an after-treatment solution comprising at least 20% ethylene glycol mono ethyl ether, and are exposed, after drying at a temperature not over 60° C., to a temperature of 120° C. for a short time.

15. An artificial soybean protein fiber prepared from at least partially hydrolyzed soya protein, resistant to loss of flexibility on washing, plasticized with a water soluble polyhydric alcohol selected from the class consisting of glycerol, glycol and glycol ether, the resistance to washing out of the plasticizer in said fiber having been increased by subjecting the plasticizer impregnated fiber to a short heat treatment at a temperature above 100° C. to fix the plasticizer in the fiber only after the fiber has been dried at a temperature not exceeding 60° C.

16. An artificial fiber of protein disulfide resulting from oxidizing the reaction product of protein and carbon disulfide resistant to loss of flexibility on washing, plasticized with a water soluble polyhydric alcohol selected from the class consisting of glycerol, glycol and glycol ether, the resistance to washing out of the plasticizer in said fiber having been increased by subjecting the plasticizer impregnated fiber to a short heat treatment at a temperature above 100° C. to fix the plasticizer in said fiber only after the fiber has been dried at a temperature not exceeding 60° C.

17. An artificial fiber of soybean protein disulfide resulting from oxidizing the reaction product of soybean protein and carbon disulfide, resistant to loss of flexibility on washing, plasticized with a water soluble polyhydric alcohol selected from the class consisting of glycerol, glycol and glycol ether, the resistance to washing out of the plasticizer in said fiber having been increased by subjecting the plasticizer impregnated fiber to a short heat treatment at a temperature above 100° C. to fix the plasticizer in said fiber only after the fiber has been dried at a temperature not exceeding 60° C.

18. The article of claim 15 in which the plasticizer is glycerol.

19. The article of claim 16 in which the plasticizer is glycerol.

20. The article of claim 17 in which the plasticizer is glycerol.

21. The article of claim 15 in which the plasticizer is glycol.

22. The article of claim 15 in which the plasticizer is a glycol ether.

OSKAR HUPPERT.